United States Patent
Obara

(10) Patent No.: US 7,000,320 B2
(45) Date of Patent: *Feb. 21, 2006

(54) PROCESS FOR MANUFACTURING MINIATURE BALL BEARINGS

(75) Inventor: Rikuro Obara, Kitasaku-Gun (JP)

(73) Assignee: Minebea Co., Ltd., (JP)

( * ) Notice: Subject to any disclaimer, the term of this patent is extended or adjusted under 35 U.S.C. 154(b) by 242 days.

This patent is subject to a terminal disclaimer.

(21) Appl. No.: 10/371,342

(22) Filed: Feb. 20, 2003

(65) Prior Publication Data

US 2003/0154601 A1 Aug. 21, 2003

(30) Foreign Application Priority Data

Feb. 21, 2002 (JP) .............................. 2002-045132

(51) Int. Cl.
*B21D 53/10* (2006.01)
(52) U.S. Cl. .............................. 29/898.066; 29/898.063
(58) Field of Classification Search ........... 29/898.066, 29/898.063, 34 R, 557, 558, 412, 417
See application file for complete search history.

(56) References Cited

U.S. PATENT DOCUMENTS

| | | | | |
|---|---|---|---|---|
| 1,477,570 A * | 12/1923 | Lehmann | ................ | 29/898.066 |
| 1,854,897 A * | 4/1932 | Ganster | ................. | 29/898.066 |
| 1,971,083 A * | 8/1934 | Schlaa | .................. | 29/898.066 |
| 2,126,893 A * | 8/1938 | Klamp | ................... | 29/898.066 |
| 2,126,912 A * | 8/1938 | Murden | ................. | 29/898.066 |
| 3,378,903 A * | 4/1968 | Cardillo | ................. | 29/898.066 |
| 3,496,619 A * | 2/1970 | Constant | ................ | 29/898.066 |
| 3,557,587 A * | 1/1971 | Cardillo | ......................... | 72/41 |
| 3,590,674 A * | 7/1971 | Maeda et al. | ................... | 83/14 |
| 6,065,322 A * | 5/2000 | Tabata et al. | ................. | 72/334 |
| 6,620,262 B1 * | 9/2003 | Okita et al. | ................. | 148/226 |

FOREIGN PATENT DOCUMENTS

| | | | |
|---|---|---|---|
| JP | 56-113827 | * | 9/1981 |
| JP | 07-035143 | * | 2/1995 |
| JP | 07-054852 | * | 2/1995 |
| JP | 08-090129 | * | 4/1996 |

* cited by examiner

*Primary Examiner*—Eric Compton
(74) *Attorney, Agent, or Firm*—Schulte Roth & Zabel, LLP; Joel E. Lutzker; Anna Vishev

(57) ABSTRACT

A process for manufacturing miniature ball bearings that reduces material loss to improve manufacturing efficiency. The process consists of obtaining an inner and outer ring blank by cutting a first blank, forging the first blank to obtain a final blank, and separating the final blank to form an outer ring blank and an inner ring blank. The outer ring blank has an outer diameter of at most 13 mm. Cutting the first blank is performed by mechanically cutting and machining.

7 Claims, 4 Drawing Sheets

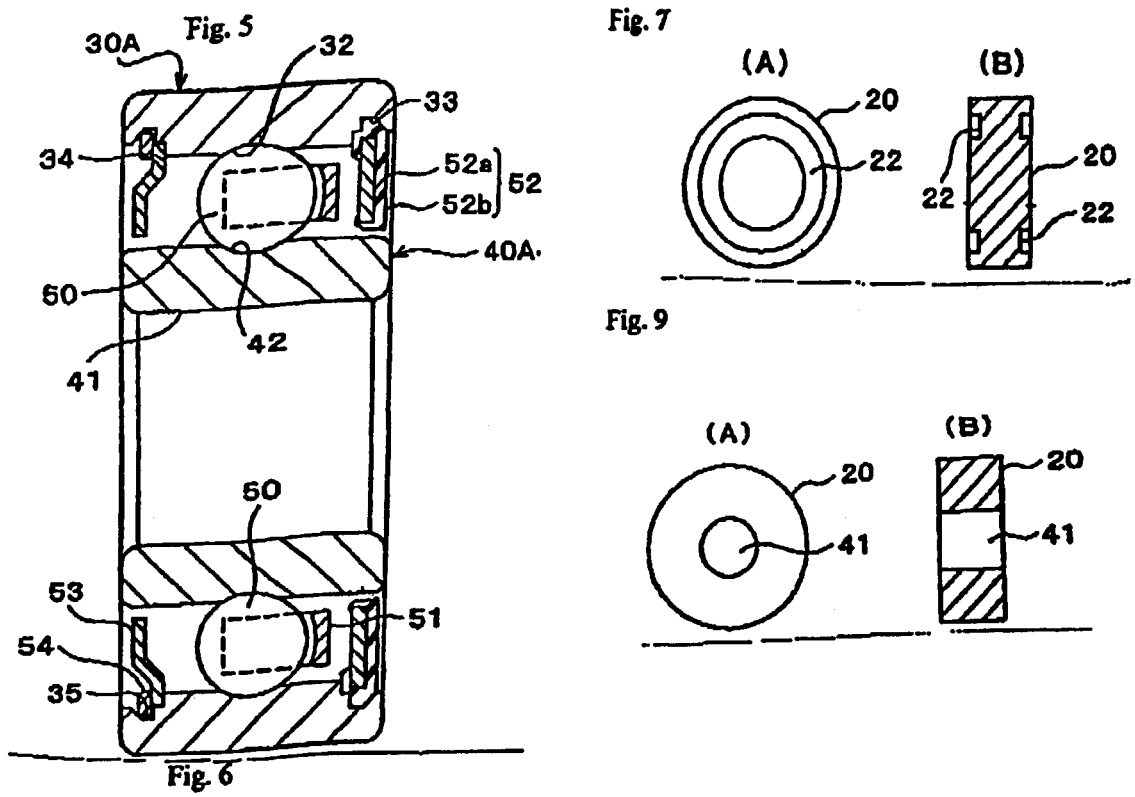
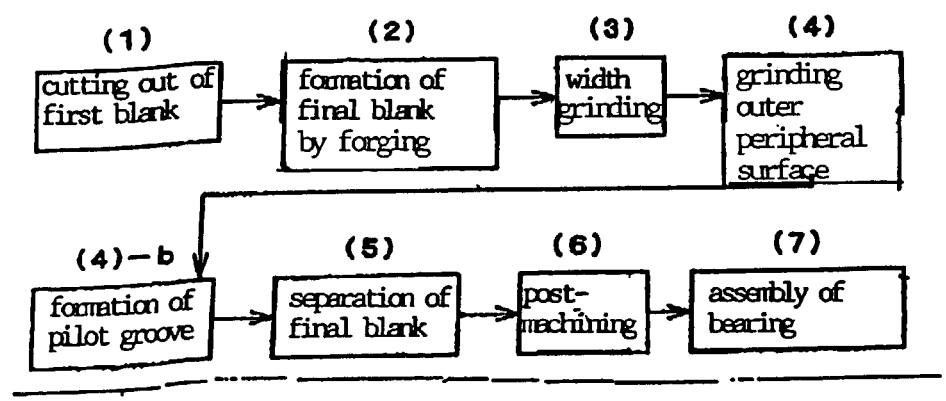

US 7,000,320 B2

PROCESS FOR MANUFACTURING MINIATURE BALL BEARINGS

CROSS-REFERENCE TO RELATED APPLICATIONS

This application claims all rights of priority to Japanese Patent Application No. 2002-045132 filed on Feb. 21, 2002, still pending.

FIELD OF THE INVENTION

The present invention relates to a process for the manufacturing of ball bearings which are subjected to a radial load.

PRIOR ART

Ball bearings subjected to radial loads have conventional configurations such that the inner ring is placed on the inner side of the outer ring. A plurality of balls are placed between these orbital rings, and the balls undergo rolling motions and are maintained at an equivalent distance from each other. Since the sliding friction is extremely small, these bearings are frequently used in a rotary section of various types of machines.

However, different types of processes for the manufacturing of the inner ring and the outer ring have been utilized over the years. For example, FIG. 14 and FIG. 15 show outer rings manufactured by making a hole 2 to accommodate an inner ring formed by a drill. The hole is in the center of the end face of a round rod shape bar thereby making the end section ring-like in shape. The ring section is cut by pushing a drill bit in from the outer side to the outer peripheral section at the deeper side of the ring section while rotating bar material 1 to obtain an outer ring blank 3. The outer ring is obtained by machining outer ring blank 3. To make the inner ring, the bar material having a smaller diameter than the bar material for the outer ring is used in the process shown in FIG. 14.

The manufacturing process shown in FIG. 15 shows a bit being pushed into a pipe material 4 that is rotated. Pipe material 4 is cut off and an outer ring blank 3 is formed. The outer ring is obtained by machining the outer ring blank 3. In addition, the inner ring is made of a pipe material having a smaller diameter than the pipe material for the outer ring. The inner ring is formed by the process shown in FIG. 15.

A disadvantage of the process shown in FIG. 14 is that as the portion of hole 2 is formed, the cutting margin of the bar material 1 becomes shaves and chips creating a large loss of material. In addition, the amount of cutting oil used is high. Especially in the case of a miniature ball bearing where the diameter of the outer ring is 13 mm or less, the ratio of loss of material for one product is large. For example, in the case of an outer ring with the width of 5 mm or less, the cutting margin may reach about 50% of the width of the outer ring to be obtained in some cases, and thus, the efficiency has been extremely poor. In addition, the shaves and chips of the material are discarded after applying an appropriate treatment process, and the cutting oil, though it might be re-used, leads to environmental contamination when discarded. Therefore, it is beneficial to reduce this waste as much as possible. Furthermore, since an inner ring and an outer ring are made from materials of different sizes, there have been complaints that it is difficult to limit the material cost, and the manufacturing efficiency is poor.

In addition, using the process of FIG. 15 for obtaining the inner ring and the outer ring, where the outer diameter of the outer ring is 13 mm or less, it is difficult to machine and the process lacks practicality. The pipe material of such size is also high in cost or difficult to obtain. Furthermore, it is similar to the process shown in FIG. 14 in that the ratio of loss of material is high and there arises a problem of environmental contamination from the cutting of the pipe material.

SUMMARY OF THE INVENTION

Therefore, it is an object of the present invention to provide a process for manufacturing miniature ball bearings in which the material loss is greatly reduced. This will limit environmental contamination and reduce the material cost, thereby improving manufacturing efficiency.

The first embodiment of the present invention relates to a process for obtaining an outer ring blank and an inner ring blank during the manufacturing process. An outer diameter of the outer ring is 13 mm or less, and an inner ring is placed at the inner side of the outer ring.

The steps of this process comprise cutting a first blank by which the material is mechanically cut. Then, forging the first blank to obtain a final blank. Separating this final blank to obtain the outer ring blank and the inner ring blank.

The second embodiment comprises the steps of cutting a first blank by which the material is mechanically cut and machined. Forging the first blank to obtain a second blank. Then, cutting the second blank into round slices to obtain a plurality of final blanks. The last step is separating these final blanks from each other to form the outer ring blanks and the inner ring blanks.

The above-mentioned language 'mechanically cut and machined' means use of a cutting device such as a saw or cutting off by use of a bit which produces shaves and chips.

Since the two blanks are obtained simultaneously from the final blank material, the loss in materials can be greatly reduced and the production efficiency is improved. In addition, since the first blank is forged to produce a final blank, it is possible to reduce the cutting area by mechanically cutting and machining the material, and by this, the loss in materials can be also reduced. Therefore, the present invention is extremely effective in manufacturing a miniature rolling bearing (where the outer diameter is 13 mm or less and the width is 5 mm or less) for which the material loss ratio has typically been high. The miniature rolling bearings are easier to manufacture. In addition, the material cost can be reduced.

Since a plurality of final blanks are obtained by cutting and separating the second blank, the width of the second blank is set to a width from which the plurality of outer ring blanks and inner ring blanks are respectively obtained. The width of the second blank is naturally wider than the width of the final blank, which is advantageous for handling prior to the separation into the outer ring blanks and the inner ring blanks.

In addition, the following steps can be added to the present invention.

In the forging step of the first and second embodiment, the inner diameter hole of the inner ring is drilled simultaneously. Drilling the inner diameter hole of the inner ring by forging rather than by cutting, is beneficial with respect to the reduction in material loss.

Prior to the separation step, the inner diameter hole of the inner ring is drilled in the final blank. The final blank is larger and easier to handle than the inner ring blank after the separation, and it is easier to form the inner diameter hole.

After drilling the inner diameter hole of the inner ring, the inner peripheral surface of the inner diameter hole is finished to a pre-determined inner diameter by a machining operation such as cutting or grinding. A larger final blank (the final blank in the first embodiment, and the second blank in the second) is easier to handle than the inner ring blank after the separation, and it is easier to finish the inner diameter hole. In addition, if this finishing of the inner diameter hole is applied to the second embodiment, it is possible to make uniform, with high precision, the inner diameter hole of the inner ring blanks.

In addition, it is possible to finish both edge faces of the final blank to a pre-determined width or the outer peripheral face of the final blank to a pre-determined outer diameter prior to the separation step. These finishing steps can be performed by a machining operation such as cutting or grinding, and since the blanks are easier to handle prior to the separation, they are easier to finish. When the width of the final blank is finished, it is possible to manufacture the outer ring blank and the inner ring blank uniformly with high precision. Therefore, it is unnecessary to individually finish the widths or finishing may be achieved only with a slight adjustment. When the widths are individually finished, it is necessary to control the grinding to make the widths uniform, however, that may become unnecessary by finishing the width of the final blank.

In addition, the present invention includes a method for providing a groove for separation. The groove allows separation of the final blank into the outer ring blank and the inner ring blank, thereby making the separation of the final blank easier.

The above advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

FIG. 5 shows a cross sectional view of a bearing assembled in the first mode of working;

FIG. 6 shows a diagram of the manufacturing steps of the second mode of working of the present invention;

FIG. 7 shows a plane view (A) and a cross sectional view (B) of a final blank on which a pilot groove is formed in the second mode of working;

FIG. 9 shows a plane view (A) and a cross sectional view (B) of a final blank in which an inner diameter hole is formed in the third mode of working;

DETAILED DESCRIPTION OF THE PREFERRED EMBODIMENTS

The following describes the processes of the present invention for the manufacturing of a miniature rolling bearing having an outer diameter of an outer ring of 13 mm or less and a width of 5 mm or less (hereinafter referred to simply as a bearing).

A. First Working Mode

Figure 1:
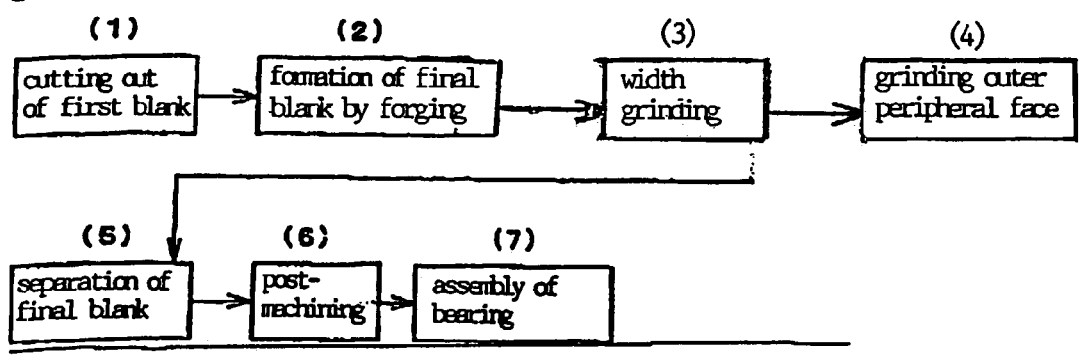
FIG. 1 shows a diagram of the manufacturing steps of the first mode of working of the present invention.

FIG. 1 shows the manufacturing steps (1) through (7) of the first working mode of the present invention. In the following, we shall explain these steps in sequence.

(1). Cutting Out the First Blank

Figure 2:
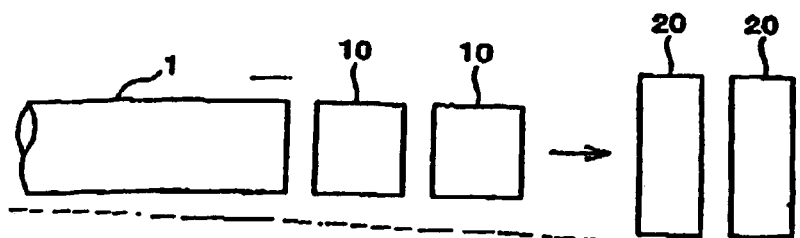
FIG. 2 shows a schematic side view of processing the bar material to final blanks in the first mode of working.

As shown in FIG. 2, a first blank 10 of a cylindrical pellet form is cut out by cutting using a saw or cutting off using a bit. The pellet is cut from a bar material that has been formed into a round rod by forging. An ordinary bearing steel material is used for bar 1, such as a high carbon chrome bearing steel which has been subjected to a pre-determined heat treatment.

(2). Forming a Final Blank by Forging

By forging first blank 10 and compressing it in an axial direction, a disk shaped final blank 20 shown in FIG. 2 is formed. The outer diameter and the width of final blank 20 is approximate to that of the bearing which will be finally obtained.

(3). Grinding of the Width

Final blank 20 is subjected to width grinding by which both edge faces of final blank 20 are ground, and the width of final blank 20 is finished to the width of the bearing being produced.

(4). Grinding of the Outer Peripheral Face

The outer peripheral face of final blank 20 is subjected to grinding, and the outer diameter of final blank 20 is finished to the outer diameter of the bearing being produced.

Figure 3:
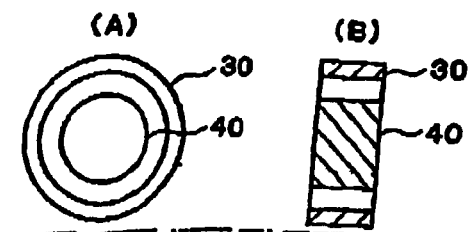
FIG. 3 shows a plane view (A) and a cross sectional view (B) showing separation of the final blank.

(5). Manufacturing of the Outer Ring Blank and the Inner Ring Blank by the Separation of the Final Blank As shown in FIG. 3, final blank 20 is cut and separated along the concentric circle at a pre-determined distance from the center by cutting. The ring on the outer peripheral side is obtained as an outer ring blank 30, and the disk at the inner peripheral side as an inner ring blank 40.

(6). Post-Processing of the Outer Ring Blank and the Inner Ring Blank

The inner peripheral face of outer ring blank 30 is ground, and the inner diameter is finished to the inner diameter dimension of the outer ring. As shown in FIG. 5, a groove 32 for the running of balls, a groove 33 for seal ring installation and a step section 34 for seal ring installation, and a groove 35 for snap ring installation are formed respectively at the center in the width direction of the inner peripheral face, at the one end side, and at the other end side. Outer ring blank 30 is finished as outer ring 30A.

Figure 4:
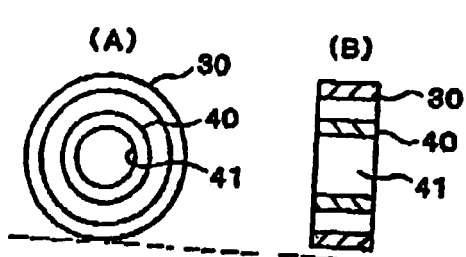
FIG. 4 shows a plane view (A) and a cross sectional view (B) of an outer ring blank and an inner ring blank obtained from the final blank.

On the other hand, as shown in FIG. 4, the center of inner ring blank 40 is cut, by drilling an inner diameter hole 41 on the inner ring, and thus, the inner ring blank 40 is made into a ring shape. The outer peripheral face of inner ring blank 40 is ground, and the outer diameter is finished to the size of the outer diameter of the inner ring. Following this, the inner peripheral face of inner ring blank 40 is ground, simultaneously finishing the inner diameter to the size of the inner diameter of the inner ring, as shown in FIG. 5. A groove 42 for the running of balls is formed at the center in the width direction of the outer peripheral face. Inner ring blank 40 is finished as inner ring 40A.

(7). Assembly of Bearing

When outer ring 30A and the inner ring 40A have been obtained as described above, inner ring 40A is placed at the inner side of outer ring 30A as shown in FIG. 5. A pre-determined number of balls 50 are inserted into grooves 32 and 42 such that they face each other. A retainer 51 is fitted to each of balls 50, thereby holding balls 50 at equal intervals in a freely rolling manner. After washing and rinsing, lubricating oil is applied in between retainer 51 and balls 50. Finally, a seal ring 52 is fitted into groove 33 of outer ring 30A, and another seal ring 53 is fitted into stepped section 34 on the opposite side. Snap ring 54 is fitted into groove 35. In this case, seal ring 52 is obtained by coating a core bar 52a with rubber 52b, and is maintained in its position by fitting it into groove 33 by utilizing the elasticity of rubber 52b. In addition, seal ring 53 is made of a metal, and its position is maintained by snap ring 54. The bearing shown in FIG. 5 is assembled in the above-mentioned procedure.

Since the two rings, outer ring blank 30 and inner ring blank 40, are obtained at the same time from final blank 20, the loss in material is greatly reduced, and the manufacturing efficiency is improved. In addition, since final blank 20 is made by forging first blank 10, bar material 1 can have a smaller diameter than final blank 20, and this allows the cut area of the bar material to be small, thereby reducing the loss in material. Therefore, for manufacturing a miniature ball bearing having an outer diameter of 13 mm or less and a width of 5 mm or less, this process is extremely effective, and the manufacturing is simple and easy. In addition, a reduction in material costs can be achieved as the reduction of the loss in materials is accomplished. This also limits environmental contamination.

In addition, prior to step (5) in which final blank 20 is separated into outer ring blank 30 and inner ring blank 40, the width of final blank 20 is finished by grinding the width thereof in step (3), and the outer diameter thereof is finished by grinding the outer peripheral face of final blank 20 in step (4). In any of these cases, since a work piece can be more easily handled when compared to prior to the separation, the finishing is more easily accomplished. Especially, when the width is cut in step (3), it is possible to obtain a uniform width of outer ring blank 30 and inner ring blank 40 at high precision, and thus it becomes unnecessary to perform individual finishing of the widths of outer ring blank 30 and inner ring blank 40 after the separation. Therefore, the manufacturing efficiency is improved.

Additionally, inner diameter hole 41 of inner ring 40A may be formed at the time of forging in step (2). Since inner diameter hole 41 may be formed by forging, its dimension is not entirely precise. Therefore, it is finished to the desired dimension of the inner diameter as described above at the time of post-machining in step (6). If the inner diameter hole is formed in the forging step in this manner, it further reduces the loss of materials.

The first mode described above is just one example embodying the process of the present invention. Additional modes of working are modifications of the first mode.

B. Second Mode of Working

The process shown in FIG. 6 has an additional step (4)b, "formation of a pilot groove" between the above-mentioned step (4) and the above-mentioned step (5), of the first mode of working. In this step (4)b, as shown in FIG. 7, a pilot groove 22 (groove for separation) of a pre-determined width is used to separate final block 20 into outer ring blank 30 and inner ring blank 40. Pilot Groove 22 is formed on both faces of final blank 20. Pilot groove 22 can be formed by cutting or forging. By forming pilot groove 22 in this manner, the pressure on a cutting tool during separation is reduced. Separation can be accomplished by cutting in the next step (5), or the separation can be achieved by punching out by means of a press in place of cutting. In either case, the separation of final blank 20 becomes easier.

C. Third Mode of Working

Figure 8:
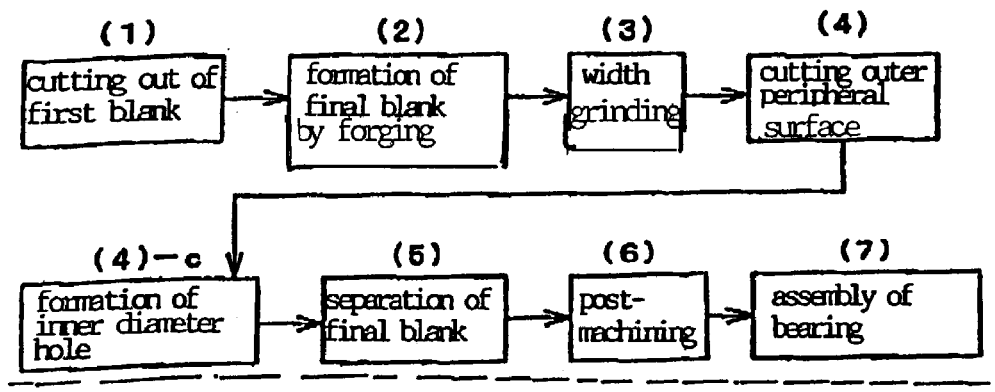
FIG. 8 shows a diagram of the manufacturing steps of the third mode of working of the present invention.

The process for the manufacturing in the third mode of working shown in FIG. 8 has an additional step (4)c, "formation of an inner hole of an inner ring" between the step (4) and step (5), of the first mode of working. As shown in FIG. 9, in step 4(c) an inner diameter hole 41 is formed in advance by cutting out the center of final blank 20 prior to the separation of final blank 20. Therefore, the formation of inner diameter hole 41 in step (6) is omitted. If inner diameter hole 41 is formed prior to the separation of final blank 20, that is, final blank 20 is larger than inner ring blank 40, and there are advantages in that final blank 20 is easier to handle and inner diameter hole 41 and it is more easily formed.

D. Fourth Mode of Working

Figure 10:
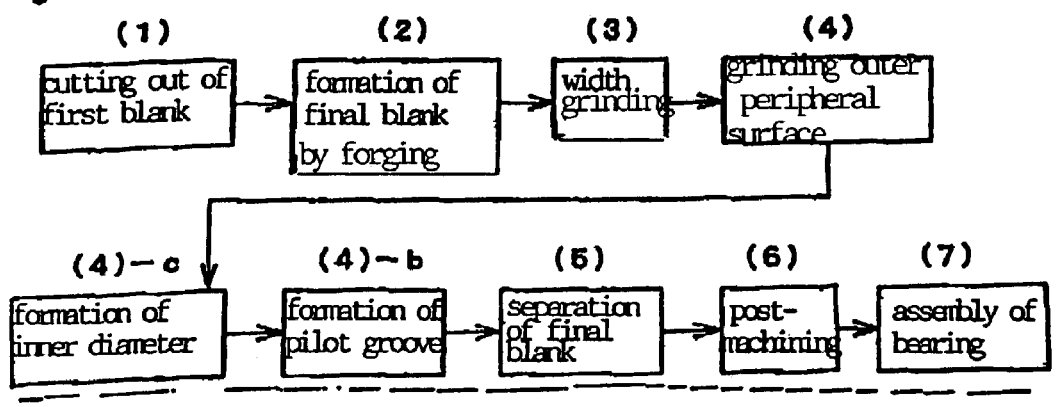
FIG. 10 shows a diagram of the manufacturing steps in the fourth mode of working of the present invention.

The process for manufacturing in the fourth mode of working shown in FIG. 10 has an additional step (4)-b of the second mode of working between step (4)c and step (5), of the third mode of working. After forming inner diameter hole 41 of the inner ring at the center of final blank 20 in step (4)c, pilot groove 22 as shown in FIG. 7 is formed on both faces of final block 20. Then, in step (5), final blank 20 is separated.

E. Fifth Mode of Working

Figure 12:
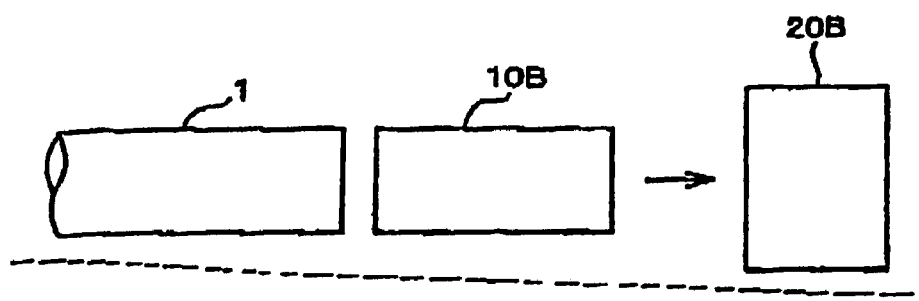
FIG. 12 shows a schematic side view of the initial step to the step in which a second blank is obtained in the fifth mode of working.
Figure 11:
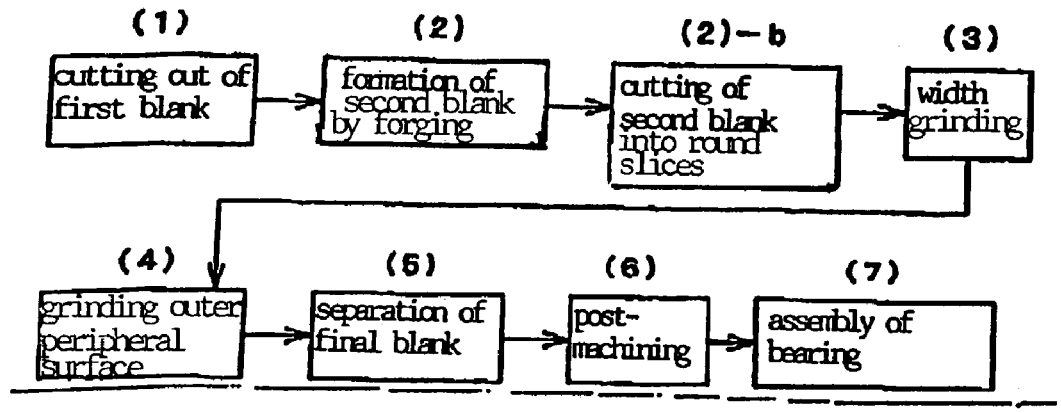
FIG. 11 shows a diagram of the manufacturing steps in the fifth mode of working of the present invention.
Figure 13:
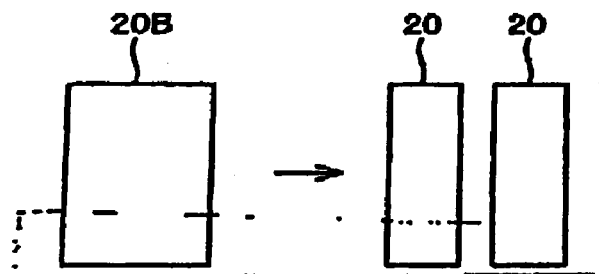
FIG. 13 shows a schematic side view of the step in which the final blank is cut in round pieces in the fifth mode of working.
Figure 14:
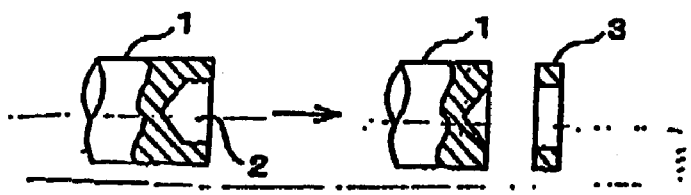
FIG. 14 shows a partially cut out cross sectional side view showing one example of a conventional process for manufacturing of an outer ring.
Figure 15:
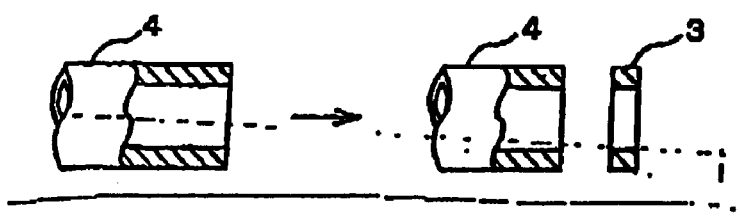
FIG. 15 shows a partially cut out cross sectional side view showing another example of a conventional process for manufacturing of an outer ring.

In the manufacturing process of the fifth mode of working shown in FIG. 11, a first blank 10 B of a cylindrical form is cut out from bar material 1 by cutting, as shown in FIG. 12. The length of first blank 10 B is set to the length which makes it possible to obtain pluralities of sets of outer ring blanks 30 and inner ring blanks 40, respectively. In next step (2), forging to compress first blank 10 B in the axial direction is performed, thereby forming second blank 20 B of a cylindrical shape as shown in FIG. 12. The width of this second blank 20 B is set to the width which makes it possible to obtain pluralities of sets of outer ring blanks 30 and inner ring blanks 40, respectively. In step (2)b, second blank 20 B is cut into round pieces, as shown in FIG. 13, thereby forming a plurality (2 in the case shown in the drawing) of final blanks 20. Second blank 20B may be cut into many round pieces. After this, similarly to the above-mentioned first mode of working, outer ring blanks 30 and inner ring blanks 40 are obtained from final blanks 20 in step (3) through step (7). Step (3) through Step (7) may be performed in accordance with any of the above described modes of working.

When second blank 20 B is obtained in the stage prior to final blank 20 it is made thick in advance, this provides an advantage in the handling prior to the separation of outer ring blanks 30 and inner ring blanks 40. It is possible to add step (4)b or step (4)c with respect to the plurality of final blanks obtained by cutting round pieces in this fifth mode of working.

Here each of the above-mentioned modes of working is applied to a miniature ball bearing in which rolling elements are balls, and the present invention can be applied to all types of miniature ball bearings which utilize needles and rollers, etc. as rolling elements.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed alternative embodiments may be possible, and fall within the claims. For example, where multiple alternative embodiments are described, in many cases it will be possible to combine elements or steps of different embodiments, or to combine elements of the embodiments described here with elements of other embodiments that are not expressly described. It will be appreciated that many of those undescribed embodiments are within the literal scope of the following claims, and others are equivalent.

The invention claimed is:

1. A process for manufacturing miniature rolling bearings to obtain an outer ring blank and an inner ring blank, comprising:
    cutting a first blank from a bar shaped material by mechanically cutting and machining;
    forging said first blank obtaining a second blank;
    cutting said second blank obtaining a plurality of final blanks; and
    separating said plurality of final blanks obtaining an outer ring blank and an inner ring blank for each final blank;
    wherein each outer ring blank has an outer diameter of at most 13 mm and the inner ring blanks are disposed inside the outer ring blanks.

2. The process according to claim 1, wherein during said forging step an inner diameter hole for the inner ring blank is simultaneously drilled.

3. The process according to claim 1, wherein an inner diameter hole for the inner ring blank is drilled prior to said separating step.

4. The process according to claim 3, wherein an inner peripheral surface of said inner diameter hole is finished to a pre-determined inner diameter by machining.

5. The process according to claim 1, wherein said two edge faces of said final blank are finished to a pre-determined width by machining.

6. The process according to claim 1, wherein an outer peripheral face of said final blank is finished to a pre-determined outer diameter by machining.

7. The process according to claim 1, further comprising the step of forming a groove for separating said final blank into the inner ring blank and the outer ring blank.

* * * * *